US009623984B2

(12) United States Patent
Steinwandel et al.

(10) Patent No.: US 9,623,984 B2
(45) Date of Patent: Apr. 18, 2017

(54) METHOD FOR PRODUCING A SURFACE STRUCTURE WITH LIGHTNING PROTECTION, AND SURFACE STRUCTURE WHICH CAN BE PRODUCED IN THIS WAY

(75) Inventors: Juergen Steinwandel, Uhldingen (DE); Martin Englhart, Schoenau (DE); Dietrich P. Jonke, Haar (DE); Helmut Piringer, Baldham (DE); Wilhelm Wulbrand, Markdorf (DE)

(73) Assignee: EADS Deutschland GmbH, Ottobrunn (DE)

( * ) Notice: Subject to any disclaimer, the term of this patent is extended or adjusted under 35 U.S.C. 154(b) by 606 days.

(21) Appl. No.: 14/122,426

(22) PCT Filed: May 25, 2012

(86) PCT No.: PCT/DE2012/000548
§ 371 (c)(1),
(2), (4) Date: Feb. 28, 2014

(87) PCT Pub. No.: WO2012/163325
PCT Pub. Date: Dec. 6, 2012

(65) Prior Publication Data
US 2014/0197273 A1 Jul. 17, 2014

(30) Foreign Application Priority Data

May 27, 2011 (DE) .......................... 10 2011 103 334
Sep. 7, 2011 (DE) .......................... 10 2011 112 518

(51) Int. Cl.
*B64D 45/02* (2006.01)
*B29C 70/88* (2006.01)
*B32B 15/14* (2006.01)

(52) U.S. Cl.
CPC ............ *B64D 45/02* (2013.01); *B29C 70/885* (2013.01); *B32B 15/14* (2013.01); *Y10T 156/10* (2015.01)

(58) Field of Classification Search
USPC ........................................ 361/218
See application file for complete search history.

(56) References Cited

U.S. PATENT DOCUMENTS 3,989,984 A * 11/1976 Amason ................ B29C 70/885
244/1 A
4,080,643 A * 3/1978 Cline ..................... B64D 45/02
361/218
(Continued)

FOREIGN PATENT DOCUMENTS

DE    10 2006 046 002 A1    4/2008
DE    10 2008 042 782 A1    4/2010
(Continued)

OTHER PUBLICATIONS

International Search Report (PCT/ISA/210) with partial English translation dated Sep. 3, 2012 (Eight (8) pages).
(Continued)

*Primary Examiner* — Scott Bauer
(74) *Attorney, Agent, or Firm* — Crowell & Moring LLP

(57) ABSTRACT

A method for producing a surface structure with a lightning strike protective system involves providing a support structure based on a fiber-reinforced composite material. At least one arrangement of a lightning strike protective material made from or with a conductive material is applied onto the support structure so that the lightning strike protective material arrangement adheres to the support structure in such a way that it is held securely in its position. A cover material is applied in such a way that it embeds the at least one arrangement of a lightning strike protective material that
(Continued)

Figure 1:
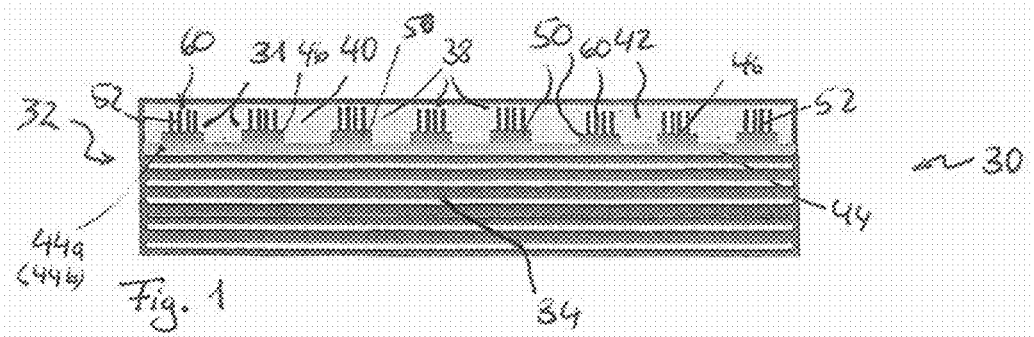

is held securely in its position on the support structure, and the cover material is solidified.

12 Claims, 2 Drawing Sheets

(56) References Cited

U.S. PATENT DOCUMENTS

| | | | | |
|---|---|---|---|---|
| 4,155,896 A * | 5/1979 | Rennier | ............... | C09D 5/24 |
| | | | | 252/512 |
| 4,262,321 A * | 4/1981 | Cline | ............... | B64D 45/02 |
| | | | | 361/218 |
| 4,429,341 A * | 1/1984 | King | ............... | B64D 45/02 |
| | | | | 361/117 |
| 4,824,713 A * | 4/1989 | Brick | ............... | B64D 45/02 |
| | | | | 174/2 |
| 5,003,311 A * | 3/1991 | Roth | ............... | B32B 7/02 |
| | | | | 156/279 |
| 5,126,185 A * | 6/1992 | Forrest | ............... | B64C 1/14 |
| | | | | 361/218 |
| 7,938,625 B2 * | 5/2011 | Dahl | ............... | B64D 45/02 |
| | | | | 29/889.7 |
| 8,413,929 B2 * | 4/2013 | Kamino | ............... | B29C 65/562 |
| | | | | 244/1 A |
| 2007/0141927 A1 * | 6/2007 | Brown | ............... | B29C 70/885 |
| | | | | 442/6 |
| 2009/0227162 A1 * | 9/2009 | Kruckenberg | ...... | B64D 45/02 |
| | | | | 442/1 |
| 2011/0014356 A1 * | 1/2011 | Fornes | ............... | H05K 9/0083 |
| | | | | 427/58 |
| 2011/0017867 A1 * | 1/2011 | Simmons | ............... | C08J 5/24 |
| | | | | 244/1 A |
| 2011/0174522 A1 | 7/2011 | Simmons et al. | | |
| 2011/0236711 A1 | 9/2011 | Ohrloff et al. | | |
| 2016/0031569 A1 * | 2/2016 | Karch | ............... | B32B 9/007 |
| | | | | 244/1 A |

FOREIGN PATENT DOCUMENTS

| | | |
|---|---|---|
| EP | 0 248 122 A2 | 12/1987 |
| EP | 0 629 549 A2 | 12/1994 |
| EP | 1 484 245 A1 | 12/2004 |
| WO | WO 2010/135318 A2 | 11/2010 |

OTHER PUBLICATIONS

German Written Opinion (PCT/ISA/237) dated Sep. 3, 2012 (Six (6) pages).
German Office Action dated Mar. 28, 2012 (Four (4) pages).

* cited by examiner

METHOD FOR PRODUCING A SURFACE STRUCTURE WITH LIGHTNING PROTECTION, AND SURFACE STRUCTURE WHICH CAN BE PRODUCED IN THIS WAY

BACKGROUND AND SUMMARY OF THE INVENTION

Exemplary embodiments of the present invention relate to a method for producing a surface structure with a lightning strike protective system. In addition, the invention relates to a vehicle component manufacturing method for producing a component of a vehicle using the surface structure production method for providing a surface structure of this component. Finally the invention relates to a surface structure that can be produced with such a method; and the invention relates to a vehicle component exhibiting such a surface structure.

The invention relates, in particular, to the production of layer systems for protecting components against lightning strikes. In particular, such components are used in aeronautical and aerospace engineering, for example, in airplanes or helicopters. However, the surface structures according to the invention can also be used in other vehicles or in other objects that may be exposed to lightning strikes, such as buildings or wind power plants.

Known layer systems are disclosed, for example, in U.S. Pat. No. 4,155,896 and in German patent document DE 10 2006 046 002 B4. The latter German patent application also discusses in detail the technological background of lightning strike protective systems. For more details on this technological background reference is made explicitly to German patent document DE 10 2006 046 002 B4 and the entire state of the art cited therein.

Components made of synthetic plastic material or components containing plastic structures suffer from the problem of providing adequate protection against lightning strikes. For example, such plastic structures in the form of plastic composite materials are used in aeronautical engineering. Composite materials made of synthetic plastic materials, in particular carbon fiber-reinforced plastics (CFRP), have the advantage that they are lightweight and yet have very good mechanical properties, such as a high strength. They can also be made into unusual irregular shapes with ease. Therefore, the use of such fiber reinforced composite materials is promising, in particular, for aeronautical engineering, where it will be used in the future to a greater extent.

The planned use of larger structures in a CFRP type of construction in aeronautical engineering requires, among other things, effective protection against a lightning strike. When lightning strikes CFRP structures, the physical processes are analogous to those with respect to metallic structures. At first a pre-discharge forms a plasma channel and then in the subsequent phase a lightning bolt is discharged. Depending on the location of the first contact point, the lightning channel is drawn over the surface of the aircraft. When the lightning channel makes contact with the aircraft surface, a high current flow and heat input are conjoined in the respective structure. The parameters, which characterize the intensity of the lightning bolt, do not differ between the CFRP structures and metallic components. Since the thermal conductivity and the electrical conductivity of CFRP structures are considerably less than those of metals, it is advantageous to provide CFRP structures, which are to be employed in the external environment, with a lightning strike protective system. Otherwise, when lightning strikes, the net result could be a considerable amount of delamination and, associated with this delamination, a loss of strength.

Figure 7:
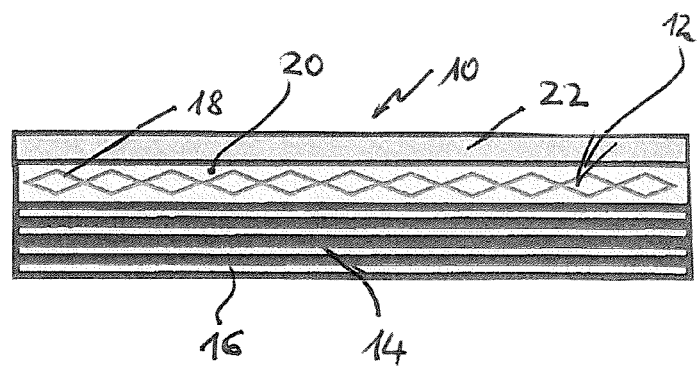

FIG. 7 shows a surface structure 10 in the form of a layer system 12 according to the state of the art that is currently put into practice in airplanes. The layer system 12 comprises a support structure 14 based on a fiber reinforced synthetic plastic material, in particular a support structure 14 with a CFRP structure 16. In practice, the current trend is to use almost exclusively lattice structures and reticulated structures made of metal in order to protect such CFRP structures against damage from lightning strikes. For this purpose FIG. 7 shows a copper wire mesh 18, which is embedded in a plastic matrix 20 made of the same synthetic plastic material as the CFRP structure 16. According to this figure, a lattice structure or a reticulated structure made of metal is laminated into the CFRP structure 16 as the outer layer, over which a surface film composed of a finish top coat 22 is applied.

Especially in the case of larger structural components, the production of such known layer systems 12 constitutes a time consuming method that is technically complicated and expensive and associated with a significant amount of dead weight.

One example of a similar surface structure is disclosed in U.S. Patent Application Publication No. 2011/0174522 A1, which relates to a prepreg formed by non-conductive fibrous structures and a fabric structure made of conductive fibers. The fibers are embedded in resin, and a composite component can be constructed from such a prepreg.

A similar surface structure is disclosed in U.S. Patent Application Publication No. 2007/0141927 A1. In this case an insulator layer is placed on a support structure 20; and a metal mesh material, such as an expanded aluminum foil, is placed on said insulator layer; and then the surface is covered with fillers and finishers, such as finish top coats.

In contrast, U.S. Patent Application Publication No. 2009/0227162 A1 discloses a method for mixing particles, such as metal particles, together with nanofibers and nanotubes into finish top coats or paints, in order to produce in this way electrically conductive surface structures on fiber-reinforced composite materials by means of spray application. In another embodiment electrically conductive layers are embedded, as required, into matrix materials as foils or structures that resemble paper or as felt structures; and these prefabricated structures are then placed on the fiber-reinforced composite materials.

Contrary to the approach above, the structures according to U.S. Pat. No. 4,155,896 are provided with conductive layers in that aluminum fibers are admixed in finish top coats or the like and are then oriented in an electric field.

In the aforementioned documents the lightning strike protection is to be achieved solely by providing electrically conductive layers that are supposed to distribute the energy. This solution has not proven to be sufficient in all cases.

German patent document DE 10 2006 046 002 B4 describes a remedy for this problem. In the case of the layer structure that is known from this German patent document, polarizable and electrically conductive elongated particles are embedded in the surface film, where these particles are oriented in the thickness direction, in order to serve as lightning triggering elements. For more details of this approach, reference is made to German patent document DE 10 2006 046 002 B4.

The orientation is necessary in order to achieve sufficient protection against lightning strikes.

The method for preparing such a lightning strike protective system includes that first the finish top coat is mixed with the particles and then applied onto the support structures. While the paint is still fluid, an electric field is applied in order to orient, as required, the polarizable particles in the thickness direction of the layer. The application of an electric field that is strong enough for the complete orientation of the particles is both problematic and expensive, in particular, for complicated surface structures. The desired orientation can be achieved to some extent only inadequately and with difficulty.

Therefore, exemplary embodiments of the present invention provide a method for producing surface structures with lightning protection in such a way that the method is easier to carry out and can be achieved with an improved lightning strike protective system.

The invention provides a method designed for producing a surface structure with a lightning strike protective system and that comprises the steps:

a) providing a support structure based on a fiber-reinforced composite material;

b) applying at least one arrangement of a lightning strike protective material made from or with a conductive material onto the support structure so that the lightning strike protective material arrangement adheres to the support structure in such a way that it is held securely in its position;

c) applying a cover material in such a way that it embeds the at least one arrangement of a lightning strike protective material that is held securely in its position on the support structure; and d) solidifying the cover material that is applied.

In accordance with the invention the arrangement of a lightning strike protective material is formed by an arrangement of electrically conductive particles as lightning triggering elements that are held securely in their position on the support structure prior to the embedding in the covering material.

By applying the lightning strike protective system before the cover material, which embeds the lightning strike protective system, the desired distribution, arrangement and/or configuration of the lightning strike protective material can be achieved and fixed in position. Then the application and solidification of the cover material appropriately embeds the desired arrangement of a lightning strike protective material and stabilizes the arrangement.

The arrangement of the lightning strike protective material is composed of individual particles that are intended to act, for example, as the lightning triggering elements. At the same time these particles and their distribution can be pre-fixed, as required. This pre-fixing allows at least one end of the particles to be already correctly fixed in position, so that the orientation of the particles can be correspondingly better predefined.

The cover material lends itself preferably to forming an outer surface film that is suitable against environmental factors. For example, the cover material may be a preferably highly stable thermoplastic material. In a preferred embodiment a polyether ketone, for example, as a polyether ether ketone (PEEK), is used as the cover material. Such materials are easily capable of being shaped, on the one hand, and, on the other hand, can be applied in a liquid state, and yet are sufficiently temperature stable and weatherproof as well as resistant to external mechanical impact.

Preferably the lightning strike protective materials, which are formed as particles, of the arrangement of lightning strike protective material are glued directly or indirectly onto the support structure. The lightning strike protective materials can be connected conductively and can be connected to a conductive structure, in particular for dissipating the voltages. In order to trigger the lightning strike, isolated particles, for example polarizable particles, are also suitable according to the discussion of the technological background that is presented in German patent document DE 2006 046 002 B4. Therefore, the particles can also be completely surrounded by non conductive materials.

Based on the aforesaid, one advantageous embodiment of the method provides that step b) comprises:

b1) gluing the at least one arrangement of a lightning strike protective material by means of an adhesive onto the support structure.

Step b1) includes, according to another advantageous embodiment:

b1a) applying the adhesive on the support structure over a wide area, in order to form a continuous adhesive surface, or b1 b) applying the adhesive on the support structure in certain regions, in order to form a plurality of adhesive areas, or b1 c) applying the adhesive on the support structure at certain points.

Additional embodiments are characterized by the fact that the adhesive that is to be applied in step b1) is an electrically conductive adhesive or an electrically non-conductive adhesive.

The particles may be polarizable particles. Preferably the particles are oblong. For example, the particles may be formed by fibers, in particular short fibers, and even more particularly by carbon fibers. Another possibility would also be small tubes, such as nanotubes, in particular carbon nanotubes. However, it is also possible to use filaments, such as silicon carbide filaments, graphite filaments or metal filaments or to use pin shaped particles, such as metal pins. If filaments are used, then they have preferably at least one pointed end that has to be directed away so that said end projects from the support structure.

In another embodiment the arrangement of a lightning strike protective material can also be produced by spraying individual metal pins onto the support structure.

The metal pins can be produced, for example, from any suitable metal powder, such as, in particular, aluminum powder.

The arrangement of a lightning strike protective material is applied preferably to a CFRP structure as the support structure.

Based on the aforesaid, a preferred embodiment of the method provides that step a) comprises the production of a two-dimensional flat component substrate from a CFRP composite material, in particular, an epoxy resin reinforced with carbon fibers.

It may be advantageous to provide a protective layer, in particular against exposure to temperature conditions, between the arrangement of a lightning strike protective material and the support structure. This protective layer can be formed, for example, by a felt made of conductive fibers and/or non conductive fibers.

Preferably, the intermediate layer comprises a non-woven fibrous structure.

BRIEF DESCRIPTION OF THE DRAWING FIGURES

The invention is explained in detail below with reference to the accompanying drawings. The drawings show in FIG. 1 a schematic representation of a first embodiment of a surface structure with lightning protection.

Figure 2:
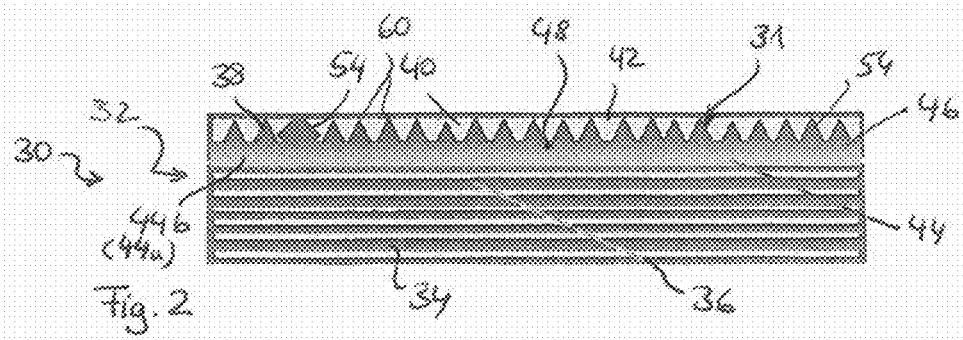

FIG. 2 a schematic representation of a second embodiment of a surface structure with lightning protection.

Figure 3:
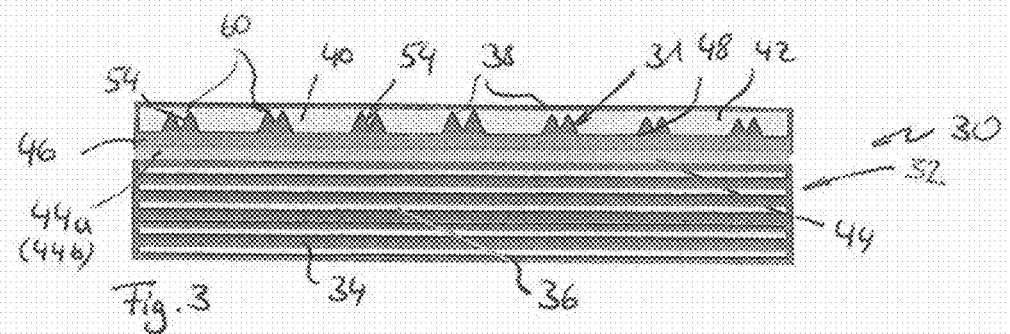

FIG. 3 a schematic representation of a third embodiment of a surface structure with lightning protection.

Figure 4:
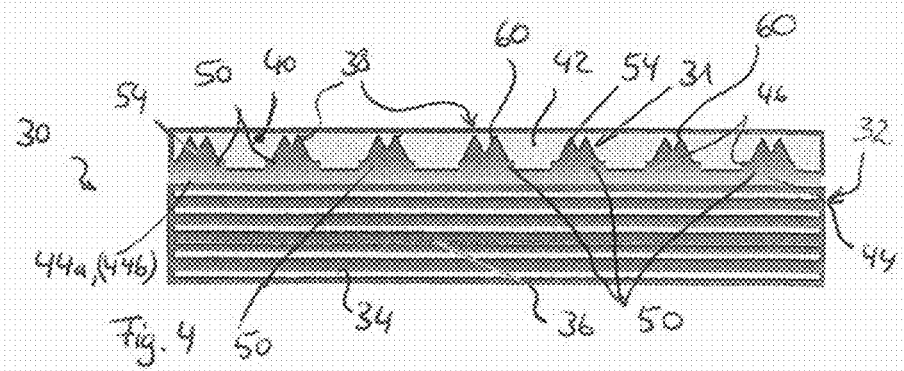

FIG. 4 a schematic representation of a fourth embodiment of a surface structure with lightning protection.

Figure 5:
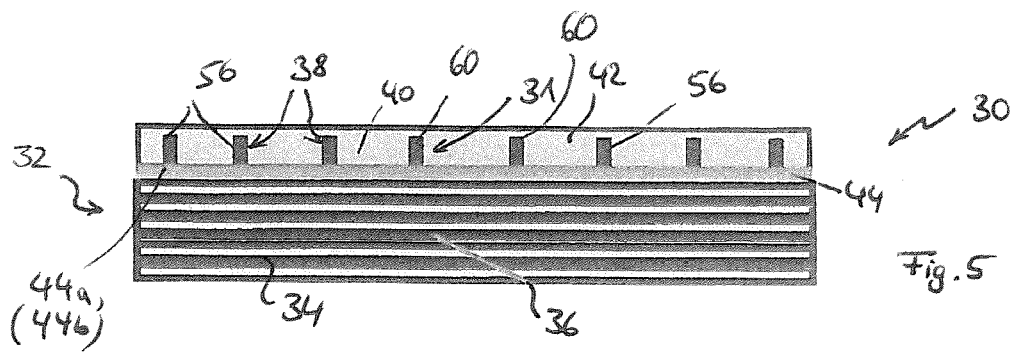

FIG. 5 a schematic representation of a fifth embodiment of a surface structure with lightning protection.

Figure 6:
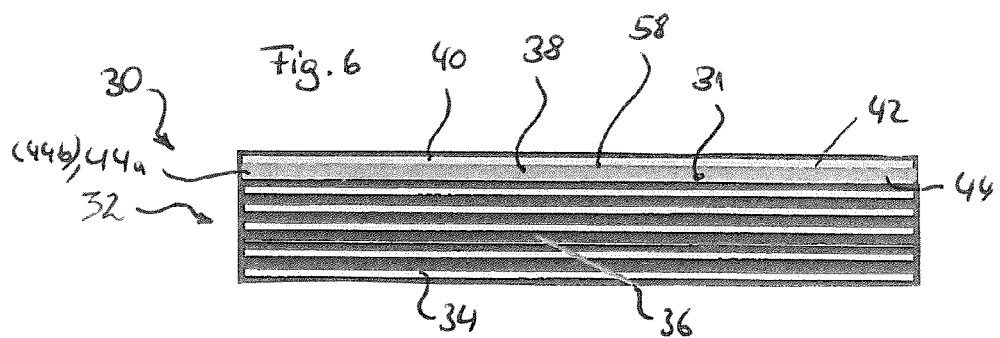

FIG. 6 a schematic representation of a sixth embodiment of a surface structure with lightning protection, and FIG. 7 a schematic representation of a surface structure with lightning protection in accordance with the state of the art.

DETAILED DESCRIPTION

A number of different embodiments of surface structures 30 with a lightning strike protective system 31 as well as advantageous methods for producing such surface structures 30 are explained in detail below with reference to the drawings in FIGS. 1 to 6.

The surface structures 30 are constructed as layer systems 32. They have a support structure 34 made of a composite material, wherein the support structure 34 comprises a CFRP structure 36. The lightning strike protective system 31 is formed by an arrangement of lightning strike protective material 38. In this case the arrangement is embedded in a surface film 40 made of a cover material in the form of a finish top coat 42, in particular of PEEK, that offers protection against environmental impact.

The method for producing the surface structures 30 includes such steps that the support structure 34 is first produced and made available, and then the arrangement of a lightning strike protective material 38 is disposed and fixed in position on this support structure 34.

For this purpose the support structure 34 is provided first with a protective layer 43 in the embodiments that are depicted in FIGS. 1 to 6. The protective layer 43 comprises, in particular, a felt 44. The felt 44 is optional and can, if desired, be omitted. In general, the optional protective layer 43 is preferably a two-dimensional flat textile structure that is formed by electrically conductive fibers or electrically non-conductive fibers.

The felt 44 is a non-woven fibrous structure made from fibers that can be made to form a conductive substrate composed of a conductive material or to form a non-conductive substrate composed of non-conductive fibrous materials. For example, a carbon felt 44a can be applied in order to form a conductive layer, or a glass fiber felt 44b can be applied in order to form a non conductive layer. The carbon felt 44a may be, for example, a felt that is commercially available under the tradename SIGRATEK®.

Furthermore, the protective layer 43 comprises a synthetic plastic material for embedding the felt 44. Suitable materials include thermoplastic resins, such as PPS or PAA.

In the embodiments according to FIGS. 1 to 4, an adhesive 46 is applied onto the support structure 43, in particular, the protective layer 43, over a wide area (FIG. 2 and FIG. 3) or in certain regions (FIG. 1 or FIG. 4) or, in particular, at certain points. In the case of the wide area application this approach provides a layer of adhesive 48, or there are areas of adhesive 50, in particular dots of adhesive.

In the embodiments according to FIGS. 1 to 4, particles of conductive materials in the form of short carbon fibers 52 or, as an alternative, also nanotubes (not shown) or in the form of filaments 54 of conductive material are applied onto the adhesive 46 and held securely by this adhesive, in order to form the arrangement of the lightning strike protective material 38.

These filaments 54 are, for example, silicon carbide filaments made of silicon infiltrated silicon carbide (Si/SiC). As an alternative, graphite filaments are possible.

In the embodiment according to FIG. 5, the arrangement of the lightning strike protective material 38 is also formed by particles. However, in order to form such particles, individual metal pins 56 are sprayed onto the support structure 34, optionally onto the felt 44. The metal pins 56 are formed, for example, from any suitable metal powder, such as aluminum powder. The spraying operation is carried out in such a way that the metal pins 56 adhere to the support structure 34.

In the embodiment according to FIG. 6, the felt 44 is used as a support for a metallic coating 58. For example, the metal coating acquires an aluminum surface coating by thermal spraying.

In all of the embodiments, following the arrangement of the lightning strike protective material, the surface film 40 is applied by applying the finish top coat 42 in liquid form. The finish top coat 42 embeds the arrangement of the lightning strike protective material 38.

A number of different embodiments of the surface structures 30 are explained in detail below with reference to the individual figures.

The first embodiment of the surface structure 30, shown in FIG. 1, is carried out by electrostatic flocking as the surface treatment. For this purpose the adhesive 46, which can be conductive or non-conductive, is applied at certain points, so that adhesive areas 50 are formed. The carbon fibers 42 or the nanotubes are held securely in these adhesive areas, and an electric field is applied in order to orient the fibers or tubes, and then the finish top coat treatment is carried out.

The net result of the above procedure is a layer system 32 composed of the CFRP structure 36, the carbon felt 44a, the adhesive areas 50 with the short carbon fibers that are embedded in the surface film 40.

The embedded carbon fibers 52 or carbon nanotubes form the lightning triggering elements 60. These lightning triggering elements 60 can be conductively connected to the substrate, or they can be electrically isolated from the substrate.

The advantages of the first embodiment of the surface structure 30, shown in FIG. 1, are a low weight per unit area due to the carbon fibers 52, the possibility of a three-dimensional shape, the non-corrosive design, the incorporation of the lightning triggering elements 60 with or without an electrical connection, the compatibility with the finish top coat and easy maintenance of the surfaces.

Optionally a conductive or non-conductive base can be carried out. This is achieved, in particular, through selection of the felt 44.

In the second embodiment of the surface structure 30, shown in FIG. 2, filaments 54 are used, instead of the fibers, as the lightning strike protective elements. The adhesive 46 is applied over a wide area. The lightning triggering elements 60, which are formed by the filaments 54, can be fastened with or without an electrically conductive connection, depending on whether a conductive adhesive 46 or a non-conductive adhesive 46 and a conductive substrate felt 44a or a non conductive substrate felt 44b are used.

In the example Si/SiC filaments are used, rather than the short CFRP fibers, as the lightning triggering elements 60.

These filaments 54 have tips that are directed outwards and can initiate the lightning triggering.

Correspondingly the second embodiment has the following layer system 32. The CFRP structure 36 is provided as the substrate. Optionally the carbon felt 44a or also, as an alternative, the glass fiber felt 44b is provided on said CFRP structure. Above this layer there is the adhesive layer 48, by means of which the filaments 54 are secured. The filaments 54 are embedded in the finish top coat 42.

The advantages of this embodiment shown in FIG. 2 are, among other things, that the layer system 32 can be applied directly onto an aircraft surface, for example, the surface of an airplane. Support-like foils or the like are not necessary. The filaments 54 create a lightning strike protective system 31 with a low mass per unit area. Any three-dimensional shape is possible. The entire design is configured in such a way that it is not corrosive. Lightning triggering elements 60 with or without an electrical connection can be provided. The design is compatible with the finish top coat. Only a minimal amount of maintenance is required. In this case, too, a conductive or non-conductive base may or may not be formed.

The third embodiment, shown in FIG. 3, corresponds essentially to the second embodiment, shown in FIG. 2, with the one difference that there are a smaller number of filaments 54, which are, thus, embedded in the surface film 40 only at certain points or in certain regions and with less weight per unit area.

The fourth embodiment shown in FIG. 4 also corresponds to the second embodiment, shown in FIG. 2, with the one difference that the adhesive 46 is arranged only in certain regions in order to form the adhesive areas 50 and that the filaments 54, which are provided as the lightning triggering elements 60, are provided correspondingly only at certain points.

In the fifth embodiment shown in FIG. 5, the arrangement of the lightning strike protective material 38 is formed by thermal spraying. For this purpose, for example, aluminum powder is melted, as required, and sprayed on in still liquid form. The felt 44 acts as a protective layer for protecting the CFRP structure 36 and as a substrate for the metal pins 56 that are formed in this way.

Hence, the layer system 32 is attained as follows:

The support structure 34 comprises the CFRP structure 36, onto which the felt 44, which is formed, for example, as a carbon felt 44a or as a glass fiber felt 44b, is applied. Then in order to form the lightning triggering elements 60, the metal pins 56 are sprayed over this felt layer in such a way that said metal pins are thermally distributed. Then the surface film 40 is applied onto these lightning triggering elements 60.

The advantages of the fifth embodiment shown in FIG. 5 are described below. Any three-dimensional shape is possible. A non-corrosive felt 44 is used as a support for the metal pins 56. The design is compatible with a finish top coat 42. Lightning triggering elements 60 are provided with or without a conductive connection. The surface is nearly maintenance free. Optionally a conductive base or non-conductive base can be provided.

Even in the case of the sixth embodiment shown in FIG. 6, the felt 44 acts as a guard for the CFRP structure 36, so that a metal layer can be applied onto the felt 44 by thermal spraying. As an alternative, electrically conductive mats with different fibers and binder options can be provided.

The net result is the following layer system 32. The support structure 34 comprises the CFRP structure 36, onto which the felt 44 is applied, and this felt is coated by thermal spraying, for example, with aluminum or a metal of any other type. On this metal coating the finish top coat 22 is applied.

The advantages of this embodiment are that any three-dimensional shape is possible; that a non-corrosive felt 44 is used as the support for a metallic coating; that the design is compatible with the finish top coat; and that the surface is nearly maintenance free.

In all of the embodiments the CFRP structure 36 may be formed from a carbon fiber-reinforced epoxy resin.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 surface structure
12 layer system
14 support structure
16 CFRP structure
18 copper wire mesh
20 plastic matrix
22 finish top coat
30 surface structure
31 lightning strike protective system
32 layer system
34 support structure
36 CFRP structure
38 arrangement of a lightning strike protective material
40 surface film
42 finish top coat
43 protective layer
44 felt
44a carbon felt
44b glass fiber felt
46 adhesive
48 adhesive layer
50 adhesive area
52 carbon fibers
54 filaments
56 metal pin
58 metal coating
60 lightning triggering element

The invention claimed is:

1. A method for producing a surface structure having a lightning strike protective system, said method comprising the steps:
    a) providing a support structure of a fiber-reinforced composite material;
    b) applying an arrangement of electrically conductive particles as the lightning triggering elements onto the support structure such that the electrically conductive particles adhere in a fixed position and in a particular arrangement and distribution on the support structure, thereby forming an arrangement of a lightning strike protective material;
    c) applying a cover material in such a way that the applied arrangement of electrically conductive particles is embedded within the cover material and is held securely in position on the support structure; and
    d) solidifying the applied cover material,
    wherein the electrically conductive particles are positioned on the support structure prior to being embedded in the cover material.

2. The method of claim 1, wherein step b) further comprises:
    b 1) gluing the arrangement of the lightning strike protective material, which is formed by the particles, on the support structure using an adhesive.

3. The method of claim 2, wherein step b1) further comprises:
b1b) applying the adhesive on the support structure in certain regions, in order to form a plurality of adhesive areas, or
b1c) applying the adhesive on the support structure at certain points.

4. The method of claim 2, wherein the adhesive applied in step b1) is an electrically conductive adhesive.

5. The method of claim 1, wherein the electrically conductive particles are selected from a group that includes fibers, carbon fibers, tubes, nanotubes, filaments, SIC filaments, graphite filaments, and metal pins.

6. The method of claim 1, wherein step b) further comprises:
spraying metal pins onto the support structure.

7. The method of claim 6, wherein the metal pins are composed of aluminum powder.

8. The method of claim 1, wherein step a) further comprises:
producing a two-dimensional flat component substrate from a CFRP composite material.

9. The method of claim 8, wherein the CFRP composite material is an epoxy resin reinforced with carbon fibers.

10. The method of claim 1, wherein prior to step b) the support structure is provided on the surface, which is to be provided with the arrangement of the lightning strike protective material, with a felt made of conductive or non-conductive fibers as an intermediate layer between the fiber-reinforced composite material and the arrangement of the lightning strike protective material.

11. A method of manufacturing a component of an aircraft, the component having a surface structure with a lightning strike protective system, the method comprising the steps:
a) providing a support structure of a fiber-reinforced composite material;
b) applying an arrangement of electrically conductive particles as the lightning triggering elements onto the support structure such that the electrically conductive particles adhere in a fixed position and in a particular arrangement and distribution on the support structure, thereby forming an arrangement of a lightning strike protective material;
c) applying a cover material in such a way that the applied arrangement of electrically conductive particles is embedded within the cover material and is held securely in its position on the support structure; and
d) solidifying the applied cover material,
wherein the electrically conductive particles are positioned on the support structure prior to being embedded in the cover material, and wherein the surface structure is of the component of the aircraft.

12. An aircraft component with a surface structure having a lighting strike protective system, the surface structure comprising:
a support structure of a fiber-reinforced composite material;
an arrangement of electrically conductive particles as the lightning triggering elements applied onto the support structure such that the electrically conductive particles adhere in a fixed position and in a particular arrangement and distribution on the support structure, thereby forming an arrangement of a lightning strike protective material; and
a cover material applied to the arrangement of electrically conductive particles in such a way that the applied arrangement of electrically conductive particles is embedded within the cover material and is held securely in its position on the support structure,
wherein the cover material is solidified and wherein the electrically conductive particles are positioned on the support structure prior to being embedded in the cover material.

* * * * *